(12) United States Patent
Mazur et al.

(10) Patent No.: US 8,469,438 B2
(45) Date of Patent: Jun. 25, 2013

(54) DOOR TRIM FASTENER

(75) Inventors: Lorin A. Mazur, Shelby, MI (US); Jesus E Dominguez Cuevas, Morelos (MX); Edwin A. Pineda Jahen, Estado de Mexico (MX); Jose L. Fajardo Garcia, Metepec (MX)

(73) Assignee: GM Global Technology Operations LLC, Detroit, MI (US)

( * ) Notice: Subject to any disclaimer, the term of this patent is extended or adjusted under 35 U.S.C. 154(b) by 260 days.

(21) Appl. No.: 13/096,057

(22) Filed: Apr. 28, 2011

(65) Prior Publication Data

US 2012/0274094 A1 Nov. 1, 2012

(51) Int. Cl.
*F16B 2/24* (2006.01)
*A44B 17/00* (2006.01)
*B60J 5/00* (2006.01)

(52) U.S. Cl.
USPC ........... 296/146.7; 296/1.08; 24/293; 24/458; 24/581.11; 52/716.7

(58) Field of Classification Search
USPC .......... 52/717.6, 717.7, 511, 489.1; 296/1.08, 296/39.1, 146.7, 146.9; 24/293, 294, 295, 24/458, 581.11
See application file for complete search history.

(56) References Cited

U.S. PATENT DOCUMENTS

| | | | | | |
|---|---|---|---|---|---|
| 2,141,700 | A | * | 12/1938 | Tinnerman | 52/511 |
| 2,222,147 | A | * | 11/1940 | Kral | 24/581.11 |
| 2,627,094 | A | * | 2/1953 | Bedford, Jr. | 24/581.11 |
| 2,644,607 | A | * | 7/1953 | Hinkel | 220/592.08 |
| 2,655,072 | A | * | 10/1953 | Jules | 411/548 |
| 2,775,010 | A | * | 12/1956 | Bedford, Jr. | 24/581.11 |
| 2,903,815 | A | * | 9/1959 | Buren, Jr. | 52/511 |
| 2,976,972 | A | * | 3/1961 | Raymond | 52/718.01 |
| 4,683,622 | A | * | 8/1987 | Oehlke | 24/458 |
| 5,347,690 | A | * | 9/1994 | Mansoor et al. | 24/295 |
| 5,526,553 | A | * | 6/1996 | Klein | 24/295 |
| 5,542,158 | A | * | 8/1996 | Gronau et al. | 24/295 |
| 5,987,714 | A | * | 11/1999 | Smith | 24/295 |
| 7,096,638 | B2 | * | 8/2006 | Osterland et al. | 52/708 |
| 7,399,151 | B2 | * | 7/2008 | Lubera et al. | 411/522 |
| 2006/0143877 | A1 | * | 7/2006 | Lee | 24/293 |
| 2008/0028577 | A1 | * | 2/2008 | Soman et al. | 24/293 |

FOREIGN PATENT DOCUMENTS

JP 2010-149579 * 7/2010

* cited by examiner

*Primary Examiner* — Robert Canfield
(74) *Attorney, Agent, or Firm* — Quinn Law Group, PLLC

(57) ABSTRACT

A fastener for securing a trim panel to a substrate of a door includes a clip portion configured for slideable insertion over an edge of the substrate, and a latch configured for passing through a slot defined by the trim panel from a direction approximately perpendicular relative to a first wall plane. The latch includes at least one finger configured for biasing against the trim panel to limit movement of the trim panel relative to the fastener.

20 Claims, 3 Drawing Sheets

DOOR TRIM FASTENER

TECHNICAL FIELD

The invention generally relates to a door assembly for a vehicle having a substrate and an interior trim panel attached to the substrate, and more specifically to a fastener for attaching the trim panel to the substrate.

BACKGROUND

Vehicle door assemblies include a trim panel that is attached to a substrate with a plurality of clip fasteners. The fasteners are attached to the substrate and secure the trim panel to the substrate. For example, the fasteners may include a clip portion that slides over an edge of the substrate, and a spring latch that extends through a slot in the trim panel and expands to engage a backside of the trim panel, thereby securing the trim panel adjacent the substrate. However, manufacturing tolerances built into the trim panel and/or the fastener to allow for assembly thereof may lead to undesirable movement of the trim panel relative to the fastener.

SUMMARY

A fastener for attaching a trim panel to a substrate is provided. The fastener includes a clip portion, which extends along a longitudinal axis. The clip portion includes a first clip wall disposed along a first wall plane, a second clip wall laterally spaced from the first clip wall, and an end clip wall interconnecting the first clip wall and the second clip wall. The first clip wall, the end clip wall and the second clip wall define a channel having a U-shaped cross section perpendicular to the longitudinal axis. The channel is configured for slideably receiving an edge of the substrate in interlocking engagement. A support wall is attached to the second clip wall. The support wall extends away from the second clip wall to a distal edge that is laterally spaced from the second clip wall along the longitudinal axis. The fastener further includes a latch. The latch is configured for releasably engaging the trim panel in interlocking engagement through a slot defined in the trim panel. The latch engages the slot from a direction approximately perpendicular relative to the first wall plane. The latch includes a first latch portion and a second latch portion. The first latch portion is attached to the distal edge of the support wall, and extends away from the first wall plane to a hinge portion. The second latch portion is attached to the hinge portion, and extends from the hinge portion toward the first wall plane in spaced relationship relative to the first latch portion. The first latch portion includes a first retention feature that extends away from the second latch portion. The second latch portion includes a second retention feature that extends away from the first latch portion. The second retention feature is disposed opposite the first retention feature across a latch plane. The first latch portion and the second latch portion are configured for resilient compression toward each other to allow the first retention feature of the first latch portion and the second retention feature of the second latch portion to pass through the slot in the trim panel, and thereafter spring outward away from the latch plane so that the first retention feature and the second retention feature engage the trim panel and secure the trim panel in place. The fastener further includes at least one finger configured for continuously biasing the trim panel to reduce movement of the trim panel relative to the latch.

A door assembly for a vehicle is also provided. The door assembly includes a substrate extending along a first wall plane and presenting an edge. A trim panel defines a slot therethrough, and is releasably coupled to the substrate by a fastener attached to the substrate. The fastener includes a clip portion that extends along a longitudinal axis. The clip portion includes a first clip wall disposed along the first wall plane, a second clip wall laterally spaced from the first clip wall, and an end clip wall interconnecting the first clip wall and the second clip wall. The first clip wall, the end clip wall and the second clip wall define a channel having a U-shaped cross section perpendicular to the longitudinal axis. The edge of the substrate is slideably disposed within the channel in interlocking engagement with the fastener. The fastener further includes a support wall. The support wall includes a horizontal portion attached to the second clip wall. The horizontal portion extends away from the first wall plane. The support wall further includes a vertical portion that extends from the horizontal portion substantially parallel with the first wall plane to a distal edge laterally spaced from the second clip wall. The fastener further includes a latch. The latch releasably engages the trim panel in interlocking engagement through the slot in the trim panel. The latch engages the trim panel from a direction approximately perpendicular relative to the first wall plane. The latch includes a first latch portion and a second latch portion. The first latch portion is attached to the distal edge of the support wall, and extends away from the first wall plane to a hinge portion. The second latch portion is attached to the hinge portion, and extends toward the first wall plane in spaced relationship relative to the first latch portion. The first latch portion includes a first retention feature extending away from the second latch portion. The second latch portion includes a second retention feature extending away from the first latch portion. The second retention feature is disposed opposite the first retention feature across a latch plane. A stop is attached to the second latch portion, and is disposed parallel with the first wall plane and approximately coplanar with the vertical portion of the support wall. The latch includes a throat. The throat is disposed on the first latch portion between the vertical portion of the support wall and the first retention feature, and is disposed on the second latch portion between the stop and the second retention feature. The first latch portion and the second latch portion are configured for resilient compression toward each other to allow the first retention feature of the first latch portion and the second retention feature of the second latch portion to pass through the slot in the trim panel, and thereafter spring outward away from the latch plane so that the first retention feature and the second retention feature engage the trim panel and secure the trim panel in place. The latch further includes a first finger and a second finger. The first finger includes a portion approximately coplanar with the first latch portion and cantilevered from the hinge portion of the latch. The first finger extends to a distal end disposed within the throat of the latch between the first retention feature and the vertical portion of the support wall. The first finger continuously biases the trim panel in a first direction away from the latch plane. The latch further includes a second finger. The second finger includes a portion approximately coplanar with the second latch portion, and is cantilevered from the hinge portion of the latch. The second finger extends to a distal end that is disposed within the throat of the latch between the second retention feature and the stop. The second finger continuously biases the trim panel in a second direction away from the latch plane.

Accordingly, the first latch portion and the second latch portion are compressed toward each other as the latch passes through the slot in the trim panel, whereupon the first latch portion and the second latch portion spring away from each other so that the first retention feature and the second retention feature may engage a back side of the trim panel to secure the trim panel relative to the substrate. The first finger and the second finger bias against the trim panel to provide a constant pressure against the trim panel, thereby preventing movement of the trim panel relative to the fastener.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," "vertical," "horizontal," "first," "second," etc., are used descriptively for the figures, and do not represent limitations on the scope of the invention, as defined by the appended claims.

Referring to the Figures, wherein like numerals indicate like parts throughout the several views, a door assembly is shown generally at 20. The door assembly 20 is for a vehicle. The door assembly 20 may include but is not limited to a side passenger door or the like, and may be shaped into any suitable size and/or configuration.

Figure 2:
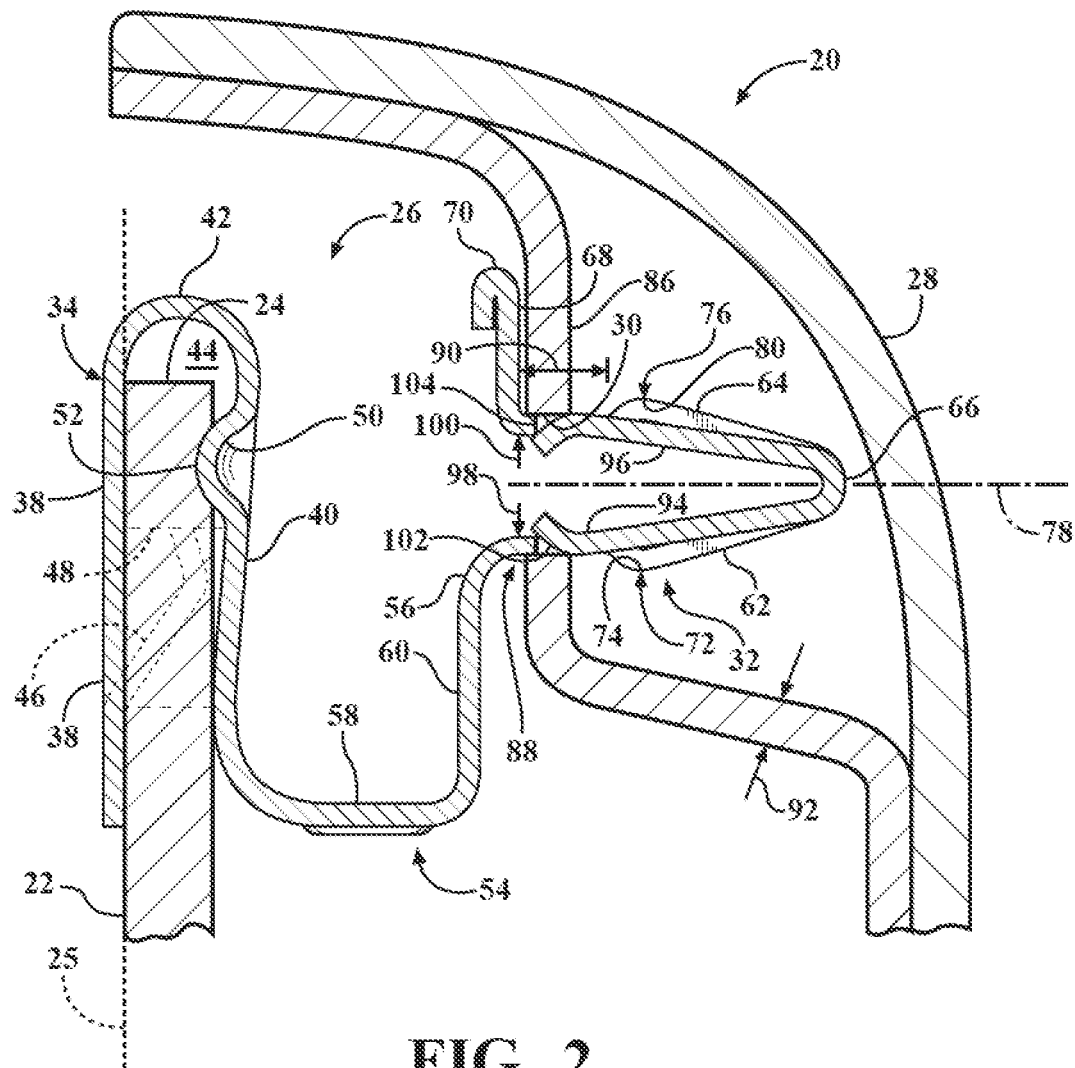
FIG. 2 is a schematic cross sectional view of the door assembly.
Figure 3:
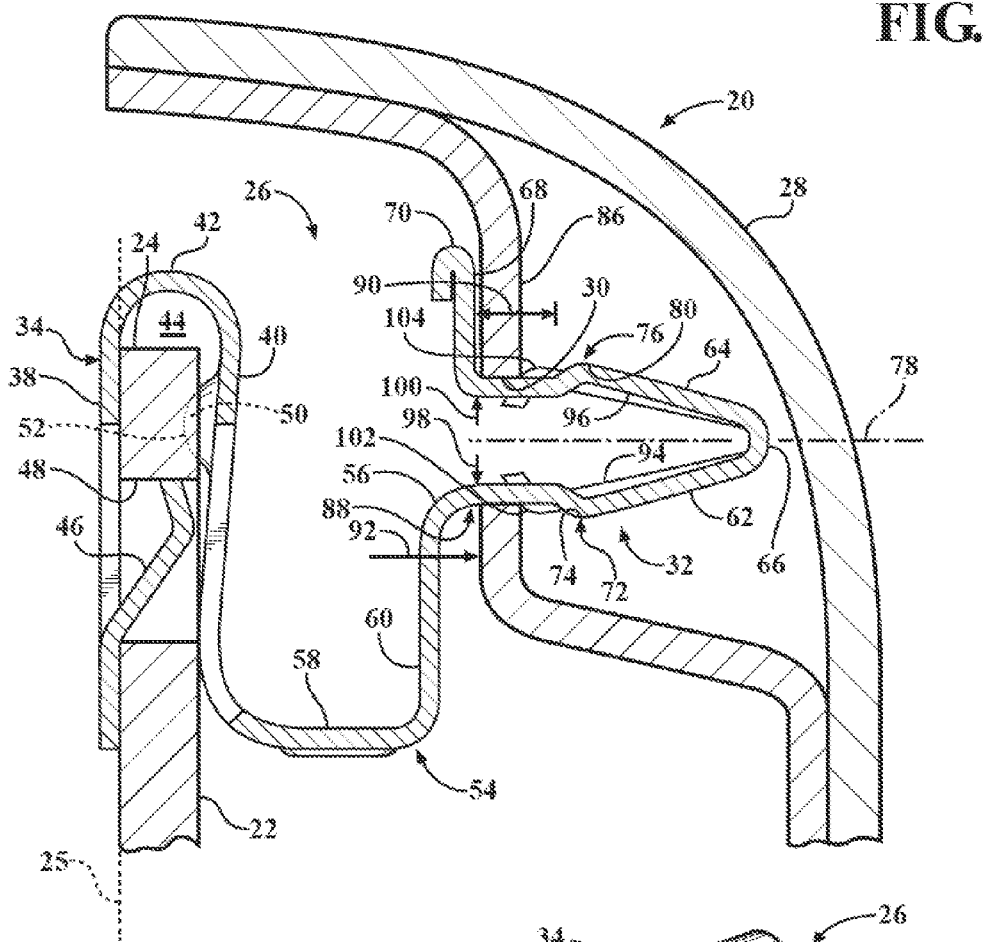
FIG. 3 is a schematic cross sectional view of the door assembly.
Figure 4:
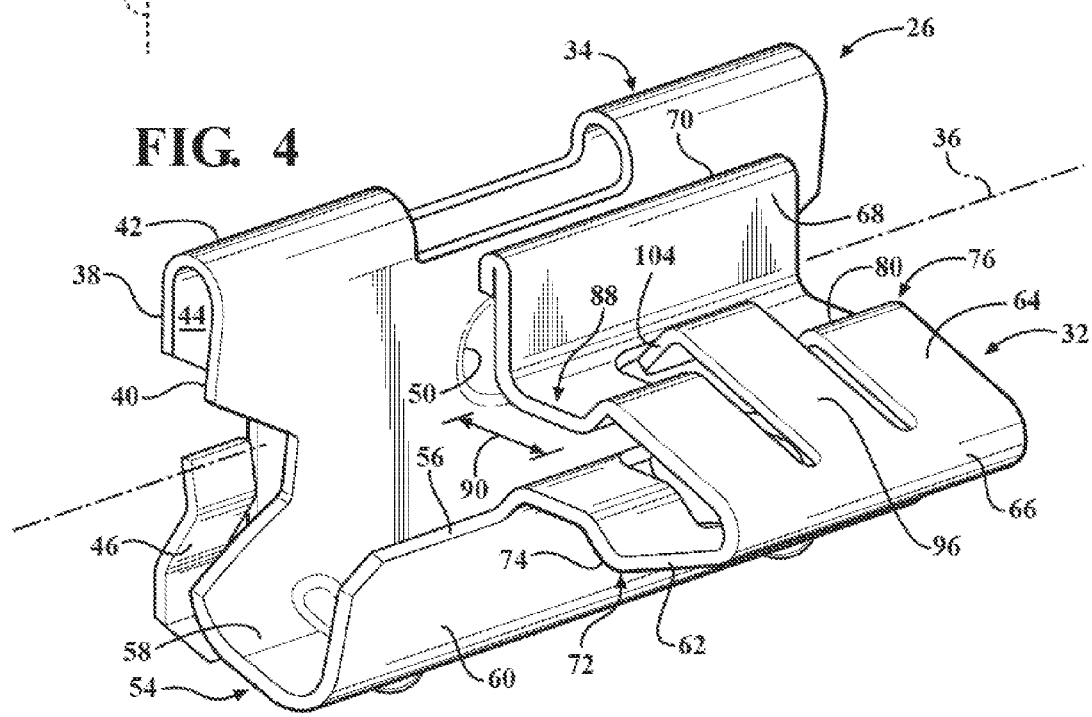
FIG. 4 is a perspective view of a fastener of the door assembly.

Referring to FIGS. 2 through 4, the door assembly 20 includes a substrate 22. The substrate 22 is a structural component of the door assembly 20. As shown, the substrate 22 extends along a generally vertical first wall plane 25, hereinafter referred to as the first wall first wall plane 25, and presents an upper edge 24. A fastener 26 is attached to the upper edge 24 of the substrate 22, and releasably couples a trim panel 28 to the substrate 22. The trim panel 28 is also disposed in a relative vertical orientation, and defines a slot 30 extending horizontally through the trim panel 28 that is configured for receiving a latch 32 of the fastener 26 therethrough, as will be described in greater detail below. It should be appreciated that the door assembly 20 may include multiple fasteners 26 securing the trim panel 28 to the substrate 22 at multiple locations, with the trim panel 28 defining multiple slots 30 to correspond with each of the multiple fasteners 26.

Referring also to FIG. 4, the fastener 26 includes a clip portion 34 that extends along a longitudinal axis 36. The clip portion 34 includes a first clip wall 38, a second clip wall 40 and an end clip wall 42. The first clip wall 38 is disposed along the first wall plane 25 of the substrate 22. The second clip wall 40 is laterally spaced from and approximately parallel with the first clip wall 38. The end clip wall 42 interconnects the first clip wall 38 and the second clip wall 40 at an upper end of the clip portion 34. The first clip wall 38, the end clip wall 42 and the second clip wall 40 define a channel 44 having a U-shaped cross section perpendicular to the longitudinal axis 36. The channel 44 is configured for slideably receiving the upper edge 24 of the substrate 22 therein in interlocking engagement, shown in FIGS. 2 and 3, with the first clip wall 38 and the second clip wall 40 configured to bias toward each other, thereby biasing against the substrate 22 and clamping the substrate 22 between the first clip wall 38 and the second clip wall 40. The fastener 26 includes and is manufactured from a spring steel to define an initial shape. Accordingly, upon being deflected out of the initial shape, the spring steel of the fastener 26 provides a bias force that tends to spring back into the initial shape.

Figure 1:
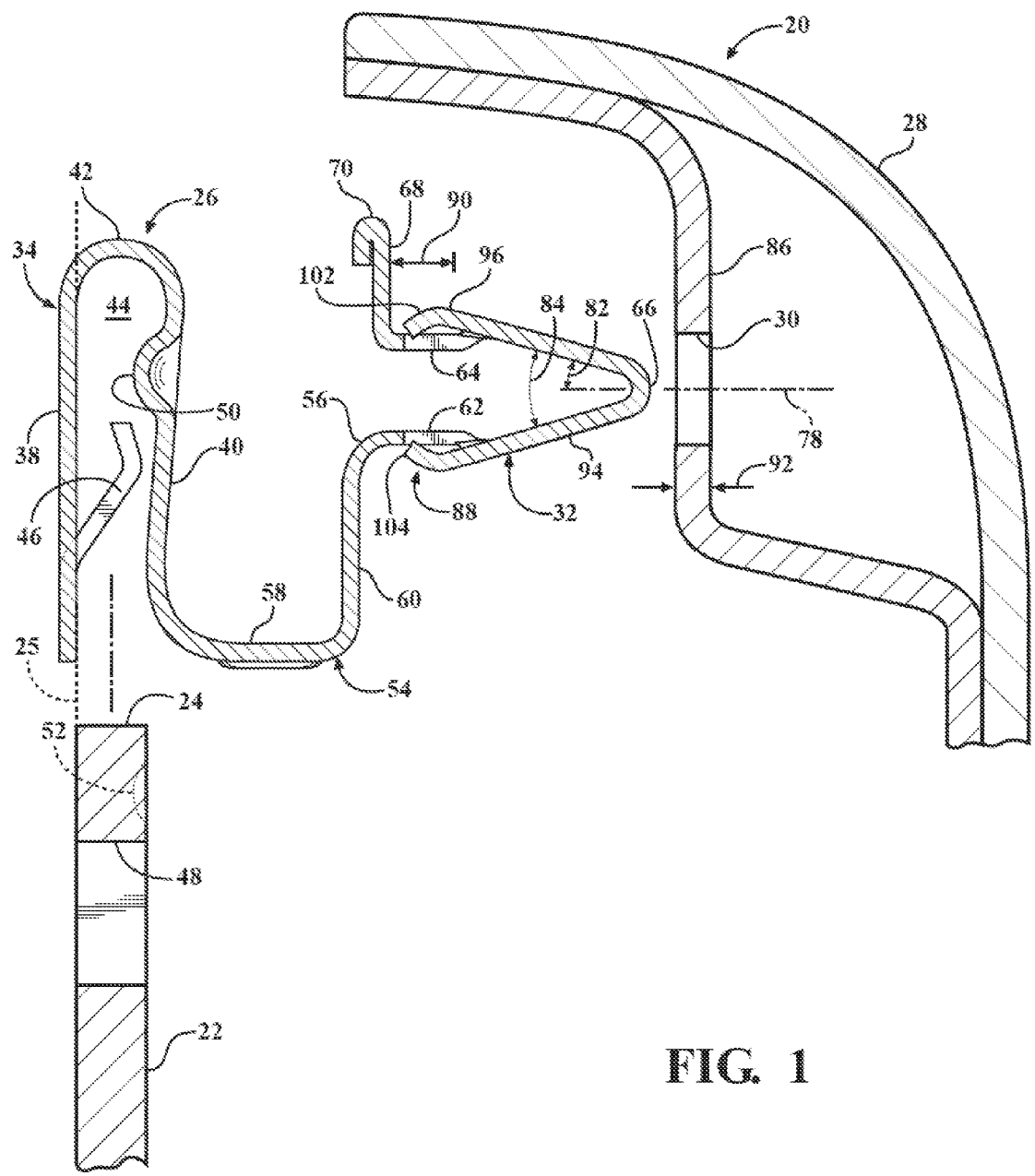
FIG. 1 is an exploded schematic cross sectional view of a door assembly.

As best shown in FIGS. 1 and 3, at least one barb 46 is disposed on one of the first clip wall 38 and the second clip wall 40. The barb 46 extends upward toward the end clip wall 42, and inward toward one of the first clip wall 38 and the second clip wall 40. As shown, the barb 46 is disposed on the first clip wall 38, and extends upward toward the end clip wall 42 and toward the second clip wall 40. However, it should be appreciated that the barb 46 may alternatively be disposed on the second clip wall 40, and extend upward toward the end clip wall 42 and the first clip wall 38. The barb 46 is configured for engaging a recess 48 in the substrate 22 in interlocking engagement to positionally secure the clip portion 34 of the fastener 26 relative to the substrate 22. Once installed in place, the barb 46 engages the recess 48 in the substrate 22, thereby locking the fastener 26 to the substrate 22 and preventing the fastener 26 from becoming dislodged from the substrate 22.

As best shown in FIGS. 1 and 2, the fastener 26 may further include a locating feature 50. The locating feature 50 may be disposed on one of the first clip wall 38 and the second clip wall 40, and is configured for mating with a corresponding feature 52 on the substrate 22 to positionally locate the clip portion 34 of the fastener 26 relative to the substrate 22. As shown, the locating feature 50 includes a semi-circular depression disposed in the second clip wall 40, and extending inward toward the first clip wall 38. The semi-circular depression of the locating feature 50 mates with a similarly sized depression formed into the substrate 22. The depression in the substrate 22 may be stamped into the substrate 22 to identify the appropriate location for the fastener 26 so that the fastener 26 properly aligns with the slot 30 in the trim panel 28.

The fastener 26 further includes a support wall 54. The support wall 54 is attached to the second clip wall 40, and extends away from the second clip wall 40 to a distal edge 56. The distal edge 56 is laterally spaced from the second clip wall 40, and extends parallel with the longitudinal axis 36 of the fastener 26. As shown, the support wall 54 includes a horizontal portion 58 and a vertical portion 60. The horizontal portion 58 is attached to the second clip wall 40, and extends horizontally away from the first wall plane 25 of the substrate 22. The vertical portion 60 extends from the horizontal portion 58 upward and substantially parallel with the first wall plane 25 of the substrate 22 to the distal edge 56 of the support wall 54. The vertical portion 60 is laterally spaced from the second clip wall 40.

As noted above, the fastener 26 further includes the latch 32. Referring to FIGS. 1 through 3, the latch 32 is configured for releasably engaging the trim panel 28 in interlocking engagement through the slot 30 defined in the trim panel 28. The latch 32 engages the trim panel 28 through the slot 30 from a direction that is approximately perpendicular relative to the first wall plane 25 of the substrate 22. This allows the trim panel 28 to be installed in a direct side-load process.

The latch 32 includes a first latch portion 62 and a second latch portion 64. The first latch portion 62 is attached to the distal edge 56 of the support wall 54, and extends approximately horizontally away from the first wall plane 25 of the substrate 22 to a hinge portion 66. The second latch portion 64 is attached to the hinge portion 66, and extends approximately horizontally toward the first wall plane 25 of the substrate 22. The second latch portion 64 is disposed in spaced relationship relative to the first latch portion 62.

A stop 68 is attached to the second latch portion 64. The stop 68 is disposed parallel with the first wall plane 25 of the substrate 22, and extends vertically upward from the second latch portion 64, parallel with the first wall plane 25 of the substrate 22, to a hemmed edge 70. The stop 68 is disposed approximately coplanar with the vertical portion 60 of the support wall 54. The hemmed edge 70 extends along the longitudinal axis 36. The hemmed edge 70 is formed by bending a portion of the stop 68 back against itself to define a rounded double thick edge surface. The hemmed edge 70 improves the ergonomic comfort of installers during manufacture of the door assembly 20.

The first latch portion 62 includes a first retention feature 72. The first retention feature 72 extends away from the second latch portion 64. As shown, the first retention feature 72 includes a first ledge 74 that is defined by the first latch portion 62 and extends along the longitudinal axis 36. The second latch portion 64 includes a second retention feature 76. The second retention feature 76 extends away from the first latch portion 62. The second retention feature 76 is disposed opposite the first retention feature 72, across a plane of the latch 32, hereinafter referred to as the latch plane 78. The latch plane 78 is a generally horizontal plane about which the first latch portion 62 and the second latch portion 64 are disposed and flex relative to each other, and defines an approximate horizontal midsection of the latch 32. As shown, second retention feature 76 includes a second ledge 80 that is defined by the second latch portion 64 and extends along the longitudinal axis 36.

Referring to FIG. 1, prior to insertion of the latch 32 through the slot 30 of the trim panel 28, each of the first latch portion 62 and the second latch portion 64 extends from the hinge portion 66, away from the latch plane 78, at an insertion angle 82. The first latch portion 62 and the second latch portion 64 define a knuckle angle 84 therebetween. The knuckle angle 84 is equal to twice the insertion angle 82.

The first latch portion 62 and the second latch portion 64 are configured for resilient compression toward each other to allow the first retention feature 72 of the first latch portion 62 and the second retention feature 76 of the second latch portion 64 to pass through the slot 30 in the trim panel 28. Referring to FIGS. 2 and 3, once the first retention feature 72 and the second retention feature 76 have passed through the slot 30 of the trim panel 28, the first latch portion 62 and the second latch portion 64 spring outward away from the latch plane 78 so that the first retention feature 72 and the second retention feature 76 engage a back side 86 of the trim panel 28, thereby securing the trim panel 28 in place relative to the fastener 26 and the substrate 22. As noted above, because the fastener 26 includes and is manufactured from the spring steel, the fastener 26, and more specifically the first latch portion 62 and the second latch portion 64 tend to spring back into their original position upon deflection.

The latch 32 defines a throat 88. The throat 88 is disposed on the first latch portion 62 between the vertical portion 60 of the support wall 54 and the first retention feature. The throat 88 is disposed on the second latch portion 64 between the stop 68 and the second retention feature 76. The throat 88 allows for manufacturing variances in the trim panel 28 so that the first retention feature 72 and the second retention feature 76 may still pass through the slot 30 of the trim panel 28, even when the trim panel 28 includes a "wave" or other deformation that would tend to position the trim panel 28 further away from the latch 32 and the substrate 22. Preferably, the throat 88 of the latch 32 defines a length 90 equal to two millimeters (2.0 mm) larger than a thickness 92 of the trim panel 28. However, it should be appreciated that the length 90 of the throat 88 may differ from the specific size described herein. The length 90 of the throat 88 is measured generally perpendicularly relative to the first wall plane 25 of the substrate 22.

The latch 32 further includes at least one finger 94, 96. The fingers 94, 96 are configured for continuously biasing the trim panel 28 away from the latch plane 78 to reduce movement of the trim panel 28 relative to the latch 32, thereby reducing and/or eliminating undesirable rattle and vibration of the trim panel 28 when installed. As shown, the fingers 94, 96 include a first finger 94 and a second finger 96. Referring to FIG. 1, prior to insertion of the latch 32 through the slot 30 of the trim panel 28, the first finger 94 includes a portion that is approximately coplanar with the first latch 32 portion. The first finger 94 is cantilevered from the hinge portion 66 of the latch 32, and extends to a distal end that is disposed within the throat 88 of the latch 32. The distal end of the first finger 94 is disposed between the first retention feature 72 and the vertical portion 60 of the support wall 54. Referring to FIGS. 2 and 3, the first finger 94 is configured for continuously biasing the trim panel 28 in a first direction 98 away from the latch plane 78. As shown in the Figures, the first direction 98 is a generally downward vertical direction. Referring to FIG. 1, prior to insertion of the latch 32 through the slot 30 of the trim panel 28, the second finger 96 includes a portion that is approximately coplanar with the second latch portion 64. The second finger 96 is cantilevered from the hinge portion 66 of the latch 32, and extends to a distal end that is disposed within the throat 88 of the latch 32. The distal end of the second finger 96 is disposed between the second retention feature 76 and the stop 68. Referring to FIGS. 2 and 3, the second finger 96 is configured for continuously biasing the trim panel 28 in a second direction 100 away from the latch plane 78. As shown in the Figures, the second direction 100 is a generally upward vertical direction. Accordingly, once the trim panel 28 is secured relative to the latch 32 as is shown in FIGS. 2 and 3, the slot 30 in the trim panel 28 compresses the first finger 94 and the second finger 96 inward toward the latch plane 78. The resiliency of the first finger 94 and the second finger 96 provides a biasing force against the slot 30 to continuously maintain pressure on the slot 30, thereby preventing the trim panel 28 from moving within the throat 88 of the latch 32 and causing undesirable rattles and/or vibration The first finger 94 includes a return portion 102 that is disposed adjacent the distal end of the first finger 94. The return portion 102 of the first finger 94 is angled toward the first latch portion 62 and the latch plane 78, and extends nearer the latch plane 78 than the first latch portion 62. The second finger 96 also includes a return portion 104. The return portion 104 of the second finger 96 is disposed adjacent the distal end of the second finger 96, and is angled toward the second latch portion 64 and the latch plane 78, and extends nearer the latch plane 78 than the second latch portion 64. The return portions 102, 104 of the first finger 94 and the second finger 96 are configured to guide the first finger 94 and the second finger 96 respectively through the slot 30 in the trim panel 28 during removal of the trim panel 28 from the latch 32. Accordingly, the return portions 102, 104 of the first finger 94 and the second finger 96 prevent the first finger 94 and the second finger 96 from catching the back side 86 of the trim panel 28 and being broken off when the trim panel 28 is removed from the latch 32.

While the best modes for carrying out the invention have been described in detail, those familiar with the art to which this invention relates will recognize various alternative designs and embodiments for practicing the invention within the scope of the appended claims.

The invention claimed is:

1. A fastener for attaching a trim panel to a substrate, the fastener comprising:
a clip portion extending along a longitudinal axis and including a first clip wall disposed along a first wall plane, a second clip wall laterally spaced from the first clip wall, and an end clip wall interconnecting the first clip wall and the second clip wall, the first clip wall, the end clip wall and the second clip wall defining a channel having a U-shaped cross section perpendicular to the longitudinal axis and configured for slideably receiving an edge of the substrate in interlocking engagement;
a support wall attached to the second clip wall and extending away from the second clip wall to a distal edge laterally spaced from the second clip wall; and
a latch configured for releasably engaging the trim panel in interlocking engagement through a slot defined in the trim panel from a direction approximately perpendicular relative to the plane, wherein the latch includes:
a first latch portion attached to the distal edge of the support wall and extending away from the plane to a hinge portion;
a second latch portion attached to the hinge portion and extending toward the plane in spaced relationship relative to the first latch portion;
wherein the first latch portion includes a first retention feature extending away from the second latch portion, and the second latch portion includes a second retention feature extending away from the first latch portion and disposed opposite the first retention feature across a latch plane;
wherein the first latch portion and the second latch portion are configured for resilient compression toward each other to allow the first retention feature of the first latch portion and the second retention feature of the second latch portion to pass through the slot in the trim panel, and thereafter spring outward away from the plane of the latch so that the first retention feature and the second retention feature engage the trim panel and secure the trim panel in place; and
at least one finger configured for continuously biasing the trim panel to reduce movement of the trim panel relative to the latch.

2. A fastener as set forth in claim 1 wherein the support wall includes a horizontal portion attached to the second clip wall and extending away from the first wall plane, and a vertical portion extending substantially parallel with the first wall plane and laterally spaced from the second clip wall.

3. A fastener as set forth in claim 2 wherein each of the first latch portion and the second latch portion extends away from the latch plane at an insertion angle.

4. A fastener as set forth in claim 3 wherein the first latch portion and the second latch portion define a knuckle angle therebetween equal to twice the insertion angle.

5. A fastener as set forth in claim 2 further comprising a stop attached to the second latch portion and disposed parallel with the first wall plane and approximately coplanar with the vertical portion of the support wall.

6. A fastener as set forth in claim 5 wherein the stop extends from the second latch portion parallel with the first wall plane to a hemmed edge, wherein the hemmed edge extends along the longitudinal axis.

7. A fastener as set forth in claim 5 wherein the latch defines a throat disposed on the first latch portion between the vertical portion of the support wall and the first retention feature, and disposed on the second latch portion between the stop and the second retention feature.

8. A fastener as set forth in claim 7 wherein the throat defines a length equal to two millimeters (2.0 mm) larger than a thickness of the trim panel.

9. A fastener as set forth in claim 7 further comprising a first finger having a portion approximately coplanar with the first latch portion and cantilevered from the hinge portion of the latch, with the first finger extending to a distal end disposed within the throat of the latch between the first retention feature and the vertical portion of the support wall, and configured for continuously biasing the trim panel in a first direction away from the latch plane.

10. A fastener as set forth in claim 9 further comprising a second finger having a portion approximately coplanar with the second latch portion and cantilevered from the hinge portion of the latch, with the second finger extending to a distal end disposed within the throat of the latch between the second retention feature and the stop, and configured for continuously biasing the trim panel in a second direction away from the latch plane.

11. A fastener as set forth in claim 10 wherein the first finger includes a return portion disposed adjacent the distal end of the first finger and angled toward the first latch portion and the latch plane, and wherein the second finger includes a return portion disposed adjacent the distal end of the second finger and angled toward the second latch portion and the latch plane, with the return portions of the first finger and the second finger configured to guide the first finger and the second finger respectively through the slot in the trim panel during removal of the trim panel from the latch.

12. A fastener as set forth in claim 1 further comprising at least one barb disposed on one of the first clip wall and the second clip wall, with the barb extending toward the end clip wall and inward toward one of the first clip wall and the second clip wall, wherein the at least one barb is configured for engaging a recess in the substrate to positionally secure the clip portion relative to the substrate.

13. A fastener as set forth in claim 1 further comprising a locating feature disposed on one of the first clip wall and the second clip wall and configured for mating with a corresponding feature on the substrate to positionally locate the clip portion relative to the substrate.

14. A fastener as set forth in claim 13 wherein the locating feature includes a semi-circular depression disposed in the second clip wall and extending inward toward the first clip wall.

15. A fastener as set forth in claim 1 wherein the first retention feature includes a first ledge defined by the first latch portion and extending along the longitudinal axis, and wherein the second retention feature includes a second ledge defined by the second latch portion and extending along the longitudinal axis.

16. A door assembly for a vehicle, the door assembly comprising:
a substrate extending along a first wall plane and presenting an edge;
a trim panel defining a slot therethrough; and
a fastener attached to the substrate and releasably coupling the trim panel relative to the substrate, the fastener comprising:
a clip portion extending along a longitudinal axis and including a first clip wall disposed along the first wall plane, a second clip wall laterally spaced from the first clip wall, and an end clip wall interconnecting the first clip wall and the second clip wall, the first clip wall, the end clip wall and the second clip wall defining a channel having a U-shaped cross section perpendicular to the longitudinal axis, with the edge of the substrate disposed within the channel in interlocking engagement with the fastener;

a support wall including a horizontal portion attached to the second clip wall and extending away from the first wall plane, and a vertical portion extending substantially parallel with the first wall plane to a distal edge laterally spaced from the second clip wall; and a latch releasably engaging the trim panel in interlocking engagement through the slot in the trim panel from a direction approximately perpendicular relative to the first wall plane, wherein the latch includes:

a first latch portion attached to the distal edge of the support wall and extending away from the first wall plane to a hinge portion; and a second latch portion attached to the hinge portion and extending toward the first wall plane in spaced relationship relative to the first latch portion;

wherein the first latch portion includes a first retention feature extending away from the second latch portion, and the second latch portion includes a second retention feature extending away from the first latch portion and disposed opposite the first retention feature across a latch plane;

a stop attached to the second latch portion and disposed parallel with the first wall plane and approximately coplanar with the vertical portion of the support wall;

a throat disposed on the first latch portion between the vertical portion of the support wall and the first retention feature, and disposed on the second latch portion between the stop and the second retention feature;

wherein the first latch portion and the second latch portion are configured for resilient compression toward each other to allow the first retention feature of the first latch portion and the second retention feature of the second latch portion to pass through the slot in the trim panel, and thereafter spring outward away from the latch plane so that the first retention feature and the second retention feature engage the trim panel and secure the trim panel in place;

a first finger having a portion approximately coplanar with the first latch portion and cantilevered from the hinge portion of the latch, with the first finger extending to a distal end disposed within the throat of the latch between the first retention feature and the vertical portion of the support wall, and continuously biasing the trim panel in a first direction away from the latch plane; and a second finger having a portion approximately coplanar with the second latch portion and cantilevered from the hinge portion of the latch, with the second finger extending to a distal end disposed within the throat of the latch between the second retention feature and the stop, and continuously biasing the trim panel in a second direction away from the latch plane.

17. A door assembly as set forth in claim 16 wherein the first finger includes a return portion disposed adjacent the distal end of the first finger and angled toward the first latch portion and the latch plane, and wherein the second finger includes a return portion disposed adjacent the distal end of the second finger and angled toward the second latch portion and the latch plane, with the return portions of the first finger and the second finger configured to guide the first finger and the second finger respectively through the slot in the trim panel during removal of the trim panel from the latch.

18. A door assembly as set forth in claim 16 wherein the stop extends from the second latch portion parallel with the first wall plane to a hemmed edge, wherein the hemmed edge extends along the longitudinal axis.

19. A door assembly as set forth in claim 16 further comprising a locating feature disposed on one of the first clip wall and the second clip wall, wherein the locating feature is in mated engagement with a corresponding feature on the substrate to positionally locate the fastener relative to the substrate.

20. A door assembly as set forth in claim 16 wherein the trim panel defines a thickness, and wherein the throat defines length equal to two millimeters (2.0 mm) larger than the thickness of the trim panel.

* * * * *